(12) United States Patent
Chen (10) Patent No.: US 10,406,856 B2
(45) Date of Patent: Sep. 10, 2019

(54) BICYCLE HUB APPARATUS

(71) Applicant: Ching-Shu Chen, Changhua (TW)

(72) Inventor: Ching-Shu Chen, Changhua (TW)

(73) Assignee: Chosen Co., Ltd, Changhua (TW)

( * ) Notice: Subject to any disclaimer, the term of this patent is extended or adjusted under 35 U.S.C. 154(b) by 278 days.

(21) Appl. No.: 15/613,626

(22) Filed: Jun. 5, 2017

(65) Prior Publication Data
US 2018/0345724 A1    Dec. 6, 2018

(51) Int. Cl.
| B60B 27/06 | (2006.01) |
| B60B 27/02 | (2006.01) |
| B62M 9/10 | (2006.01) |

(52) U.S. Cl.
CPC ............ B60B 27/06 (2013.01); B60B 27/023 (2013.01); B62M 9/10 (2013.01)

(58) Field of Classification Search
CPC ........ B60B 27/06; B60B 27/023; B62M 9/10; B62M 1/36; F16D 11/14; F16D 41/24
See application file for complete search history.

(56) References Cited

U.S. PATENT DOCUMENTS

| 5,964,332 | A | * | 10/1999 | King | ................... | B60B 27/023 |
| | | | | | | 192/46 |
| 2013/0088075 | A1 | * | 4/2013 | Spahr | ................... | B60B 27/023 |
| | | | | | | 301/110.5 |
| 2017/0096029 | A1 | * | 4/2017 | Fujita | ................. | B60B 27/0026 |

* cited by examiner

*Primary Examiner* — Huan Le
(74) *Attorney, Agent, or Firm* — Che-Yang Chen; Law Offices of Scott Warmuth (57) ABSTRACT

A bicycle hub apparatus may comprise a hub body, a freewheel shell and an elastic spacer. The hub body has an axial hub axle, and an end of the hub body comprises an open-ended connecting space. A driving ring having a plurality of first driving teeth is installed inside the connecting space. The freewheel shell mounted on the hub axle of the hub body has an open-ended connecting recess, and a coupling ring received inside the connecting recess comprises a plurality of second driving teeth which are configured to engage with the first driving teeth. The elastic spacer secured in the connecting recess is coupled with an inner surface of the coupling ring. With the elastic spacer, the second driving teeth can firmly engage with the first driving teeth of the driving ring when a bicyclist pedaling in the forward direction.

2 Claims, 9 Drawing Sheets

BICYCLE HUB APPARATUS

FIELD OF THE INVENTION

The present invention relates to a hub apparatus, and more particularly to a bicycle hub apparatus.

BACKGROUND OF THE INVENTION

Figure 7:
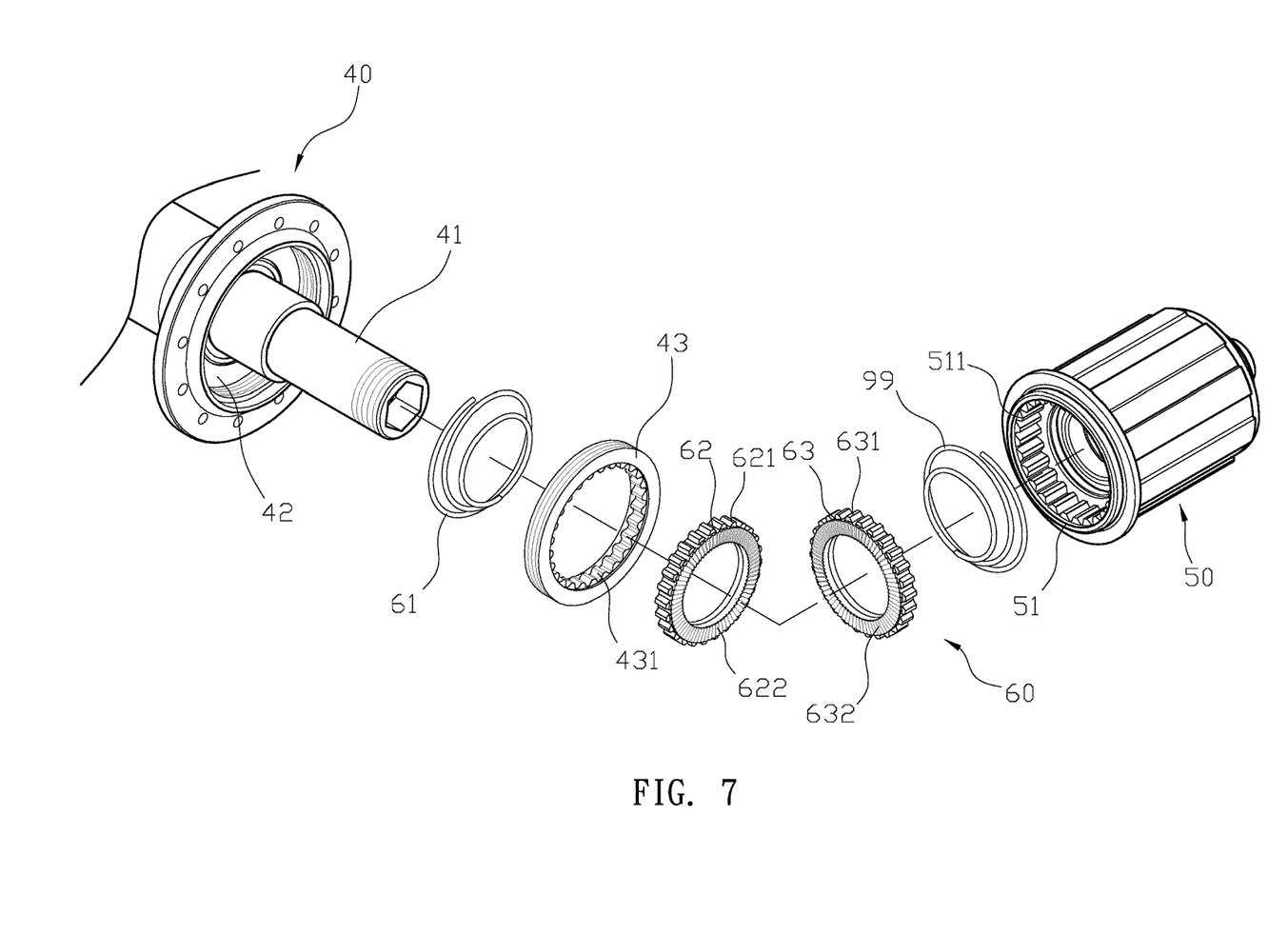
FIG. 7 is another three-dimensional exploded view of the bicycle hub apparatus in the present invention.

Referring to FIG. 7, a conventional bicycle hub apparatus comprises a hub body (40), a sleeve (50) and a driving unit (60). A hub axle (41) axially penetrates through the hub body (40). A connecting space (42) is formed at an end of the hub body (40), and an annular connecting unit (43) is installed inside the connecting space (42). A plurality of first ratchet teeth (431) are formed in sequence at an inner periphery of the connecting unit (43). The sleeve (50) is a hollow cylinder and has an open end (51) at an end thereof, and a plurality of second ratchet teeth (511) is sequentially formed at an inner periphery of the open end (51). The sleeve (50) is connected to the connecting space (42) through the open end (51), and the hub axle (41) of the hub body (40) penetrates through the sleeve (50). The driving unit (60) comprises two elastic members (61), a first ratchet ring (62) and a second ratchet ring (63), and the two elastic members (61) are spiral springs respectively disposed on the connecting space (42) of the hub body (40) and an interior space of the open end (51) of the sleeve (50). A plurality of first engaging teeth (621) and a plurality of second engaging teeth (631) are respectively formed at an outer periphery of the first ratchet ring (62) and an outer periphery of the second ratchet ring (63). The first ratchet ring (62) is configured to be coupled with the second ratchet ring (63), and a plurality of first coupling teeth (622) formed at a first surface of the first ratchet ring (62) is adapted to engage with a plurality of second coupling teeth (632) formed at a surface of the second ratchet ring (63) which is coupled with the first surface of the first ratchet ring (62). The first ratchet ring (62) is installed inside the connecting space (42) of the hub body (40), and the first engaging teeth (621) are engaged with the first ratchet teeth (431) of the connecting unit (43). Moreover, the second ratchet ring (63) is arranged inside the interior space of the open end (51) of the sleeve (50), and the second engaging teeth (631) are engaged with the second ratchet teeth (511). In addition, the two elastic members (61) respectively bear against the first ratchet ring (62) and the second ratchet ring (63) to enable the first coupling teeth (622) and the second coupling teeth (632) to be engaged and moved concurrently.

Figure 8:
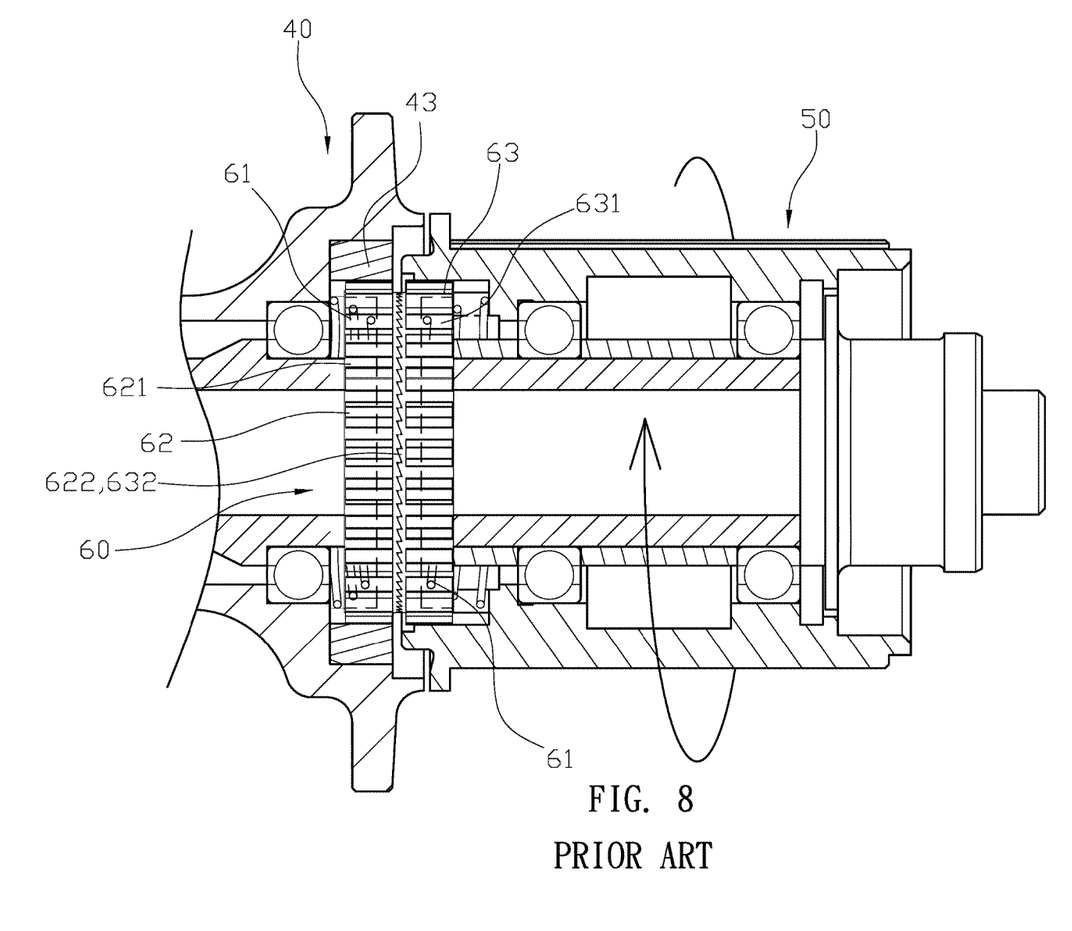
FIG. 8 is a prior art.
Figure 9:
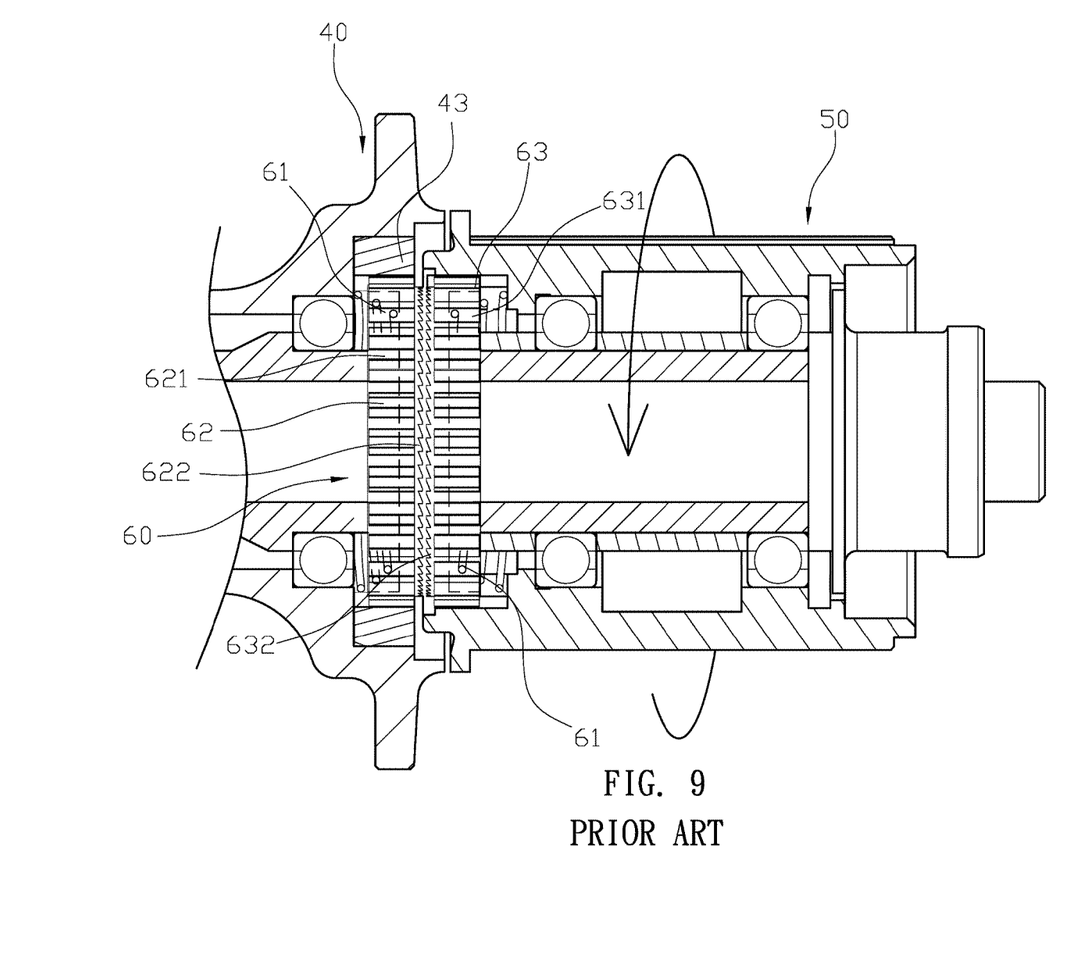
FIG. 9 is a prior art.

When a freewheel drives the sleeve (50) to turn in a forward direction, referring to FIG. 8, the second ratchet ring (63) is turned and the second coupling teeth (632) is configured to engage with the first coupling teeth (622) of the first ratchet ring (62). Thus, the first ratchet ring (62) and the hub body (40) are driven and turned concurrently in the forward direction. On the other hand, when the freewheel drives the sleeve (50) to have rotation in a reverse direction, referring to FIG. 9, the second coupling teeth (632) is disengaged from the first coupling teeth (622) and the two elastic members (61) are respectively to be compressed to detach the second ratchet ring (63) from the first ratchet ring (62), thereby leaving the sleeve (20) to have rotation independently.

However, the conventional bicycle hub apparatus is disadvantageous because: (i) the first ratchet ring (62) is engaged with the second ratchet ring (63) through the elastic members (61), which increases the manufacturing complexity and cost, and during the moving, the elastic members (61) may be compressed by the first ratchet ring (62) and the second ratchet ring (63) to lead to an unstable engagement; and (ii) the elastic members (61) are spiral springs, which cannot be evenly attached on surfaces of the first ratchet ring (62) and the second ratchet ring (63). As a result, the uneven forces are acted on the first ratchet ring (62) and the second ratchet ring (63), which leads to the engaging loose between the first coupling teeth (622) and the second coupling teeth (632). Therefore, there remains a need for a new and improved design for a bicycle hub apparatus to overcome the problems presented above.

SUMMARY OF THE INVENTION

The present invention provides a bicycle hub apparatus which comprises a hub body, a freewheel shell and an elastic spacer. The hub body has an axial hub axle, and an end of the hub body comprises an open-ended connecting space. A driving ring is installed inside the connecting space through screws, and an outer surface thereof, which is faced to the freewheel shell, has a plurality of first driving teeth arranged in a circular pattern. Moreover, at least two tool holes respectively and axially penetrate through the driving ring. The freewheel shell mounted on the hub axle of the hub body has an open-ended connecting recess which is faced to the hub body, and a plurality of first engaging teeth are formed on an inner periphery of the connecting recess. A coupling ring is received inside the connecting recess, and a plurality of second engaging teeth formed at an outer periphery of the coupling ring are provided to engage with the first engaging teeth of the connecting recess. An outer surface of the coupling ring, which is faced to the driving ring, has a plurality of second driving teeth arranged in a circular pattern, and the elastic spacer secured in the connecting recess is coupled with an inner surface of the coupling ring. The elastic spacer is formed in a ring shape, and an outer periphery of the elastic spacer is connected to at least four elastic pieces. Additionally, each of the elastic pieces is connected to the elastic spacer through a supporting segment thereof, and an elastic segment extended from the supporting segment is gradually titled to stick out of an outer surface of the elastic spacer, which is faced to the coupling ring, wherein ends of the elastic segments are faced toward the same circumferential direction.

Comparing with conventional bicycle hub apparatus, the present invention is advantageous because: (i) the elastic spacer can push the coupling ring to enable the second driving teeth to firmly engage with the first driving teeth of the driving ring when a bicyclist pedaling in the forward direction, which simplifies the structure and reduces the manufacturing costs; and (ii) the elastic spacer is formed in a ring shape, and the elastic segments can abut against and apply force on the coupling ring evenly, which avoids the engaging loose between the second driving teeth and the first driving teeth and increases the life time of the bicycle hub apparatus.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
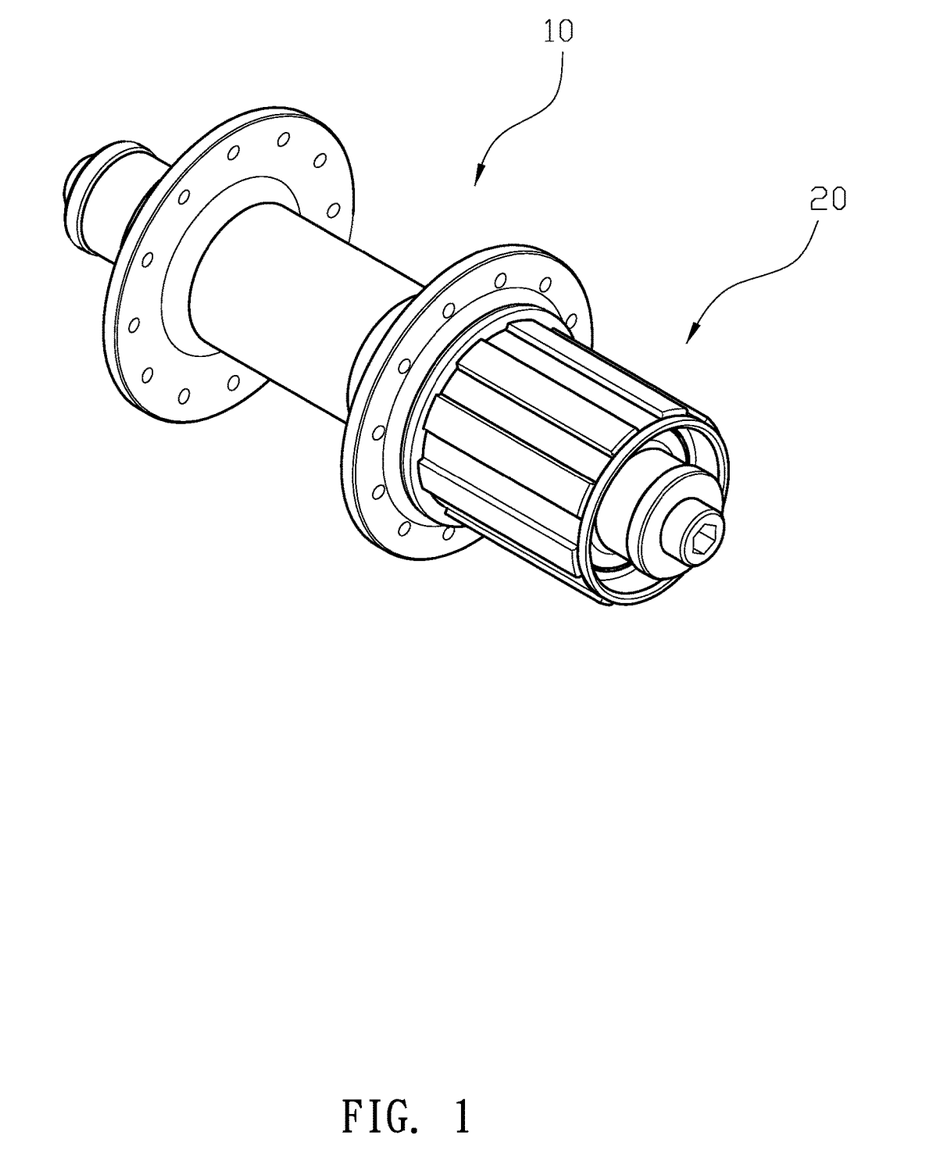
FIG. 1 is a three-dimensional assembly view of a bicycle hub apparatus in the present invention.
Figure 2:
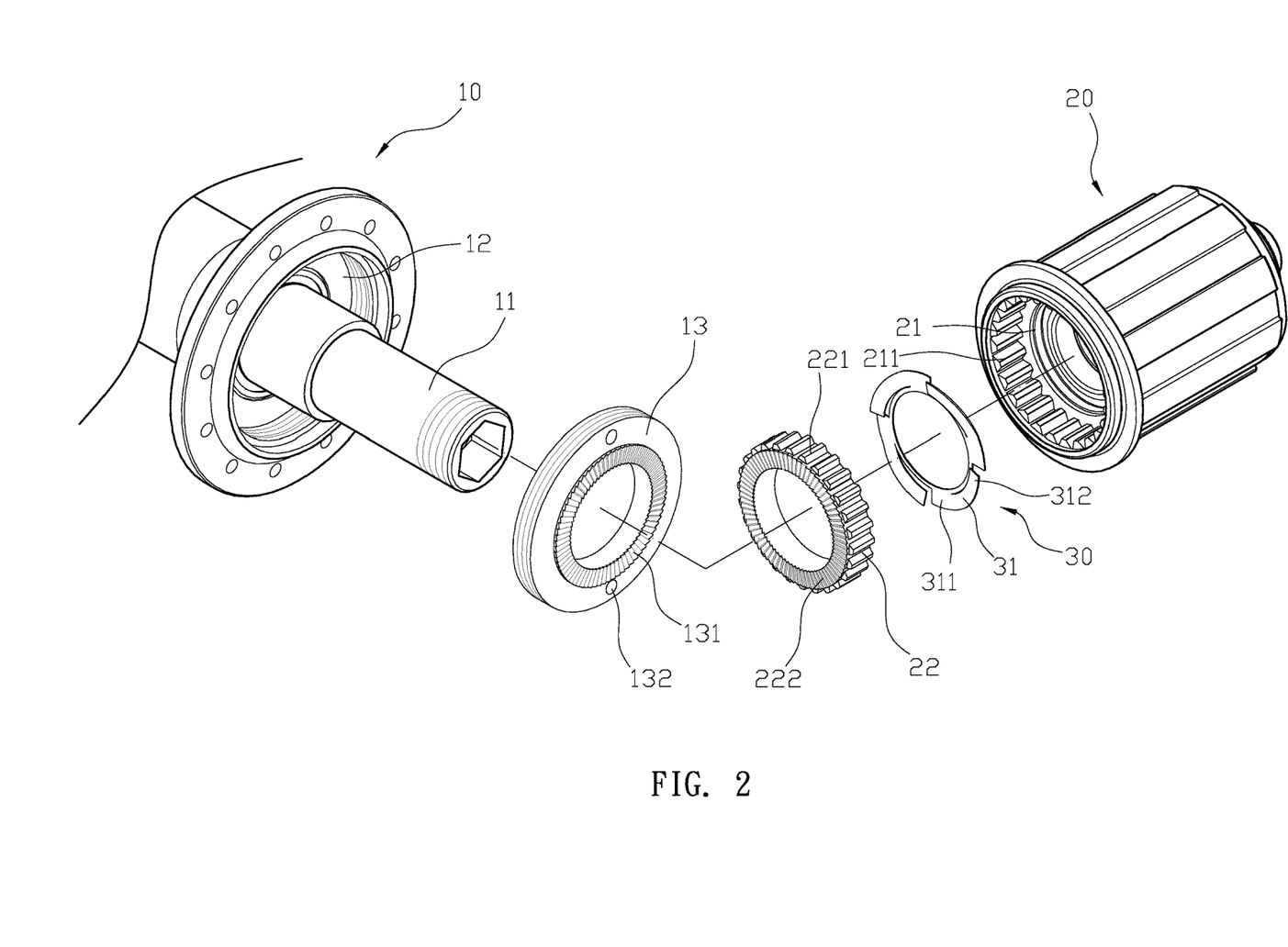
FIG. 2 is a three-dimensional exploded view of the bicycle hub apparatus in the present invention.
Figure 3:
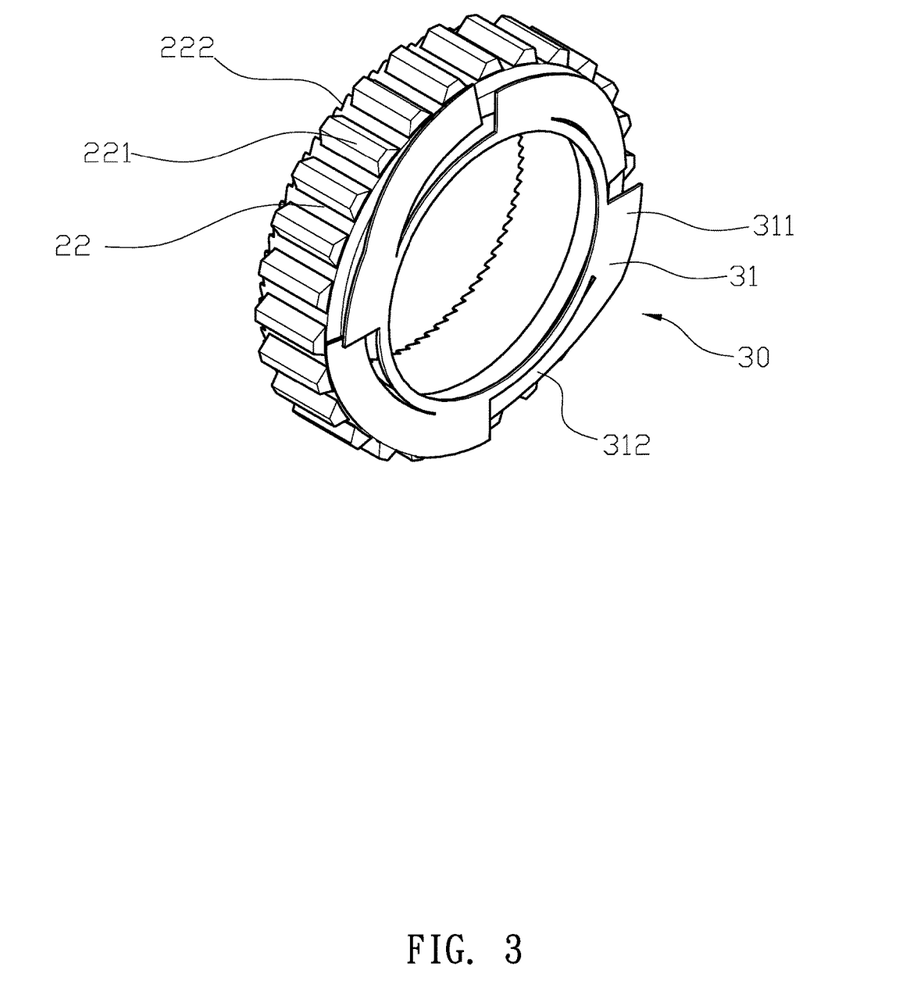
FIG. 3 is a three-dimensional view illustrating a coupling ring and an elastic spacer of the bicycle hub apparatus are coupled with each other in the present invention.
Figure 4:
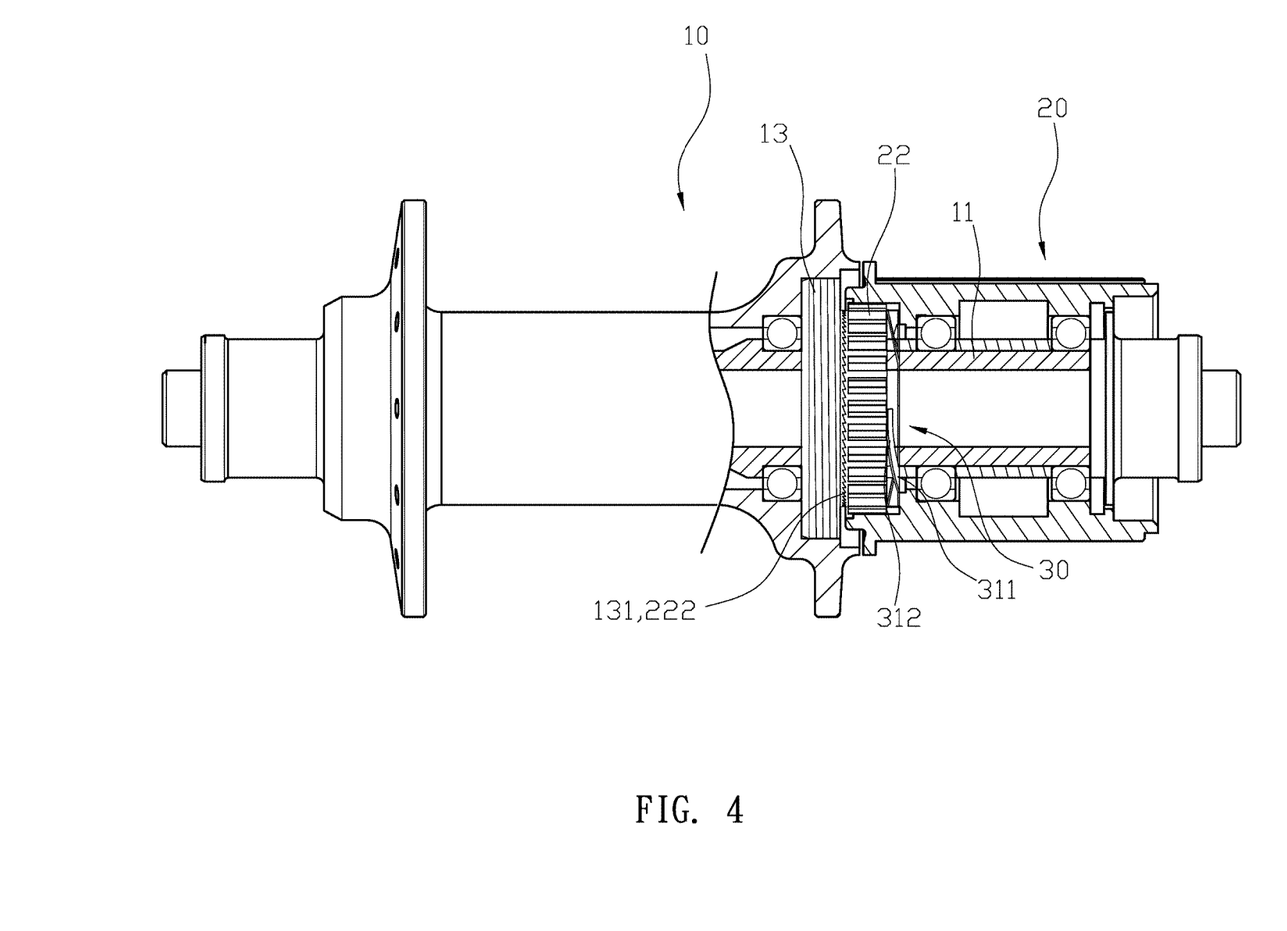
FIG. 4 is a sectional assembly view of the bicycle hub apparatus in the present invention.

In order to further understand the goal, characteristics and effect of the present invention, a number of embodiments along with the drawings are illustrated as following:

Referring to FIGS. 1 and 2, the present invention provides a bicycle hub apparatus which comprises a hub body (10), a freewheel shell (20) and an elastic spacer (30). The hub body (10) has an axial hub axle (11), and an end of the hub body (10) comprises an open-ended connecting space (12). A driving ring (13) is installed inside the connecting space (12) through screws, and an outer surface thereof, which is faced to the freewheel shell (20), has a plurality of first driving teeth (131) arranged in a circular pattern. Moreover, at least two tool holes (132) respectively and axially penetrate through the driving ring (13). The freewheel shell (20) mounted on the hub axle (11) of the hub body (10) has an open-ended connecting recess (21) which is faced to the hub body (10), and a plurality of first engaging teeth (211) are formed on an inner periphery of the connecting recess (21). A coupling ring (22) is received inside the connecting recess (21), and a plurality of second engaging teeth (221) formed at an outer periphery of the coupling ring (22) are provided to engage with the first engaging teeth (211) of the connecting recess (21). An outer surface of the coupling ring (22), which is faced to the driving ring (13), has a plurality of second driving teeth (222) arranged in a circular pattern, and the elastic spacer (30) secured in the connecting recess (21) is coupled with an inner surface of the coupling ring (22). The elastic spacer (30) is formed in a ring shape, and an outer periphery of the elastic spacer (30) is connected to at least four elastic pieces (31). Additionally, each of the elastic pieces (31) is connected to the elastic spacer (30) through a supporting segment (311) thereof, and an elastic segment (312) extended from the supporting segment (311) is gradually tilted to stick out of an outer surface of the elastic spacer (30), which is faced to the coupling ring (22), wherein ends of the elastic segments (312) are faced toward the same circumferential direction.

Referring to FIGS. 1 to 5, the driving ring (13) is installed in the connecting space (12) of the hub body (10) through screws, and the first driving teeth (131) of the driving ring (13) is faced to the coupling ring (22). The freewheel shell (20) has a connecting recess (21) which is provided to receive the elastic spacer (30) and the coupling ring (22), and the elastic segments (312) protruding from the outer surface of the elastic spacer (30) are coupled with the coupling ring (22). Furthermore, the second engaging teeth (221) of the coupling ring (22) are engaged with the first engaging teeth (211) of the connecting recess (21) to enable the coupling ring (22) and the freewheel shell (20) to be rotated concurrently. In addition, the coupling ring (22) is movable in an axial direction in the connecting recess (21). The hub axle (11) is configured to penetrate through the driving ring (13), the coupling ring (22) and the elastic spacer (13) to insert into the connecting recess (21), and the hub body (10) is abutted against the freewheel shell (20) to complete the assembly. The four elastic segments (312) of the elastic spacer (30) are configured to abut against and evenly push the coupling ring (22) toward the driving ring (13), and the second driving teeth (222) of the coupling ring (22) are engaged with the first driving teeth (131) of the driving ring (13).

Figure 5:
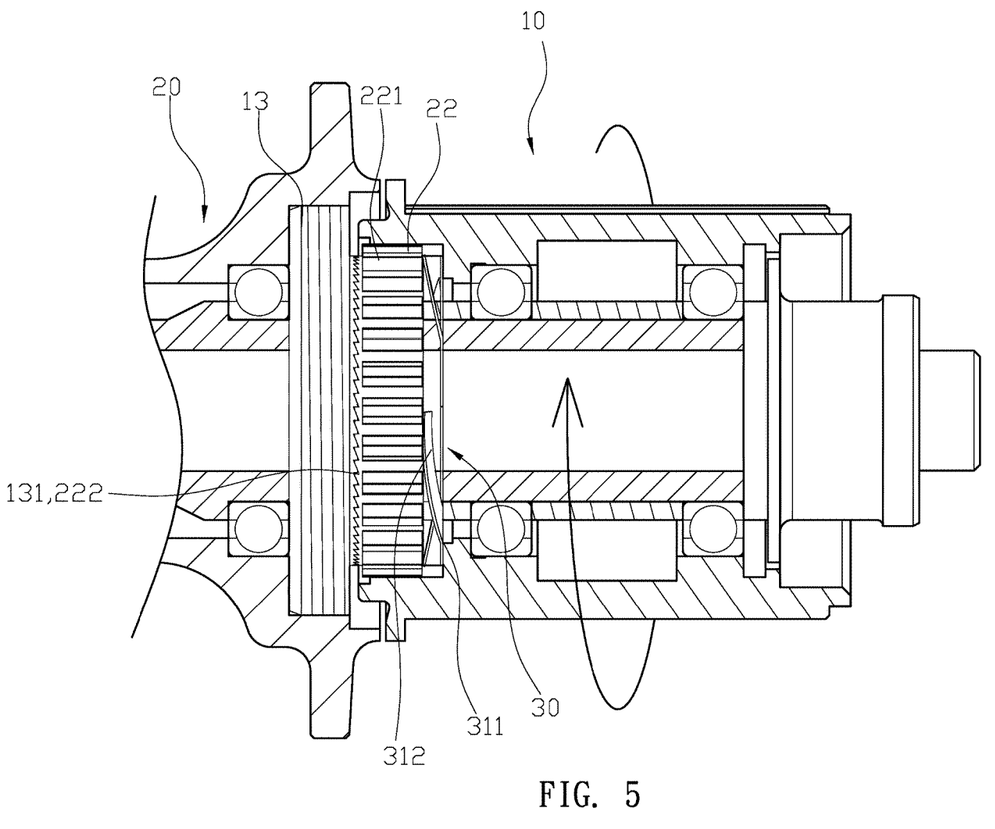
FIG. 5 is a partial enlarged sectional view illustrating a freewheel shell and a hub body of the bicycle hub apparatus are rotated concurrently in a forward direction in the present invention.

In actual application, referring to FIG. 5, a freewheel is mounted on the freewheel shell (20) (not shown in FIGs.), and when a bicyclist pedaling in a forward direction to turn the freewheel shell (20), the second driving teeth (222) of the coupling ring (22) is configured to engage with the first driving teeth (131) and to drive the driving ring (13) and the hub body (10) to have rotation concurrently, thus move a bicycle forward.

Figure 6:
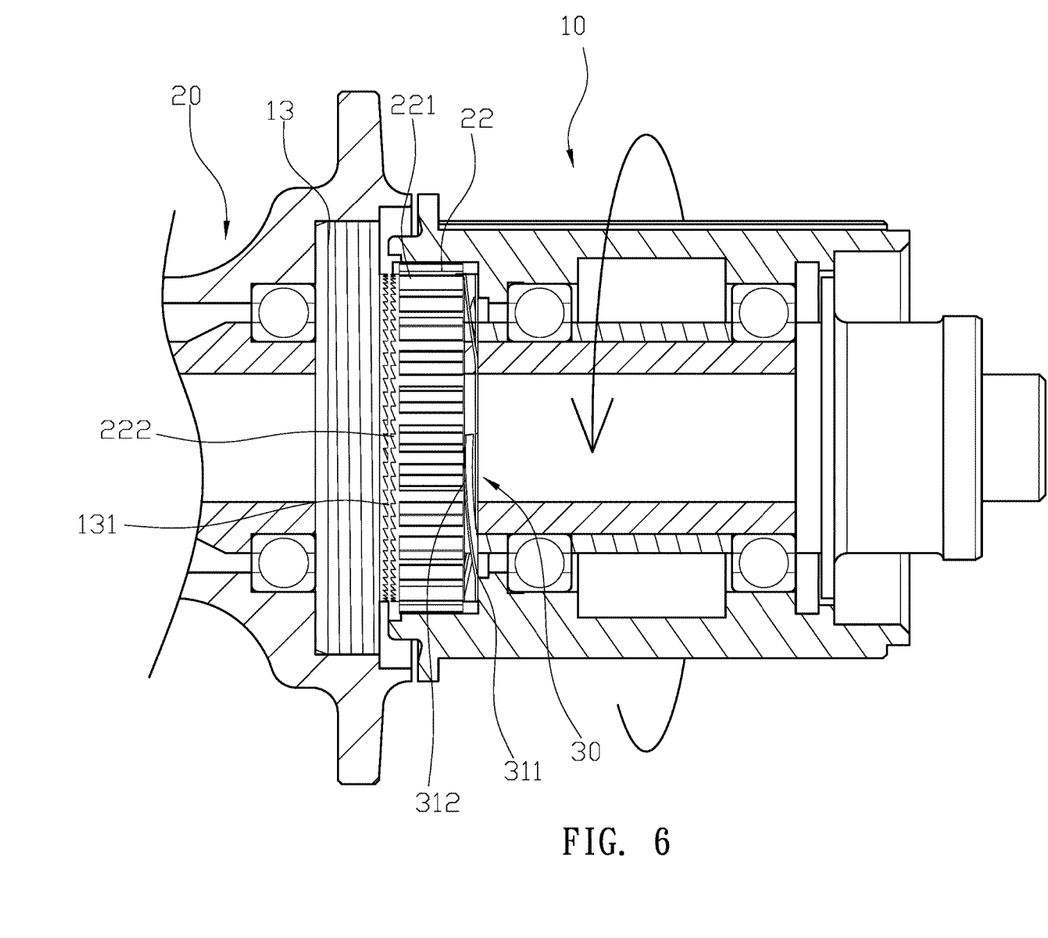
FIG. 6 is a partial enlarged sectional view illustrating the coupling ring is disengaged with a driving ring and the freewheel shell and the hub body of the bicycle hub are rotated independently when a bicyclist pedaling in a reverse direction.

Conversely, when the bicyclist pedaling in a reverse direction, referring to FIG. 6, the second driving teeth (222) of the coupling ring (22) are configured to disengage from the first driving teeth (131) of the driving ring (13), and the elastic spacer (30) is adapted to enable the coupling ring (22) to move toward an interior of the connecting recess (21). Thus, each of the hub body (10) and the freewheel shell (20) is configured to rotate independently. Moreover, when the bicyclist stops pedaling during the bicycle moving forward, the second driving teeth (222), likewise, are disengaged with the first driving teeth (131), and the bicycle keeps coasting when the hub body (10) rotating independently.

Comparing with conventional bicycle hub apparatus, the present invention is advantageous because: (i) the elastic spacer (30) can push the coupling ring (22) to enable the second driving teeth (222) to firmly engage with the first driving teeth (131) of the driving ring (13) when a bicyclist pedaling in the forward direction, which simplifies the structure and reduces the manufacturing costs; and (ii) the elastic spacer (30) is formed in a ring shape, and the elastic segments (312) can abut against and apply force on the coupling ring (22) evenly, which avoids the engaging loose between the second driving teeth (222) and the first driving teeth (131) and increases the life time of the bicycle hub apparatus.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bicycle hub apparatus comprising:
    a hub body having an axial hub axle, and an end of the hub body comprises an open-ended connecting space; a driving ring installed inside the connecting space, and an outer surface of the driving ring, which is faced to a freewheel shell, having a plurality of first driving teeth arranged in a circular pattern; and
    the freewheel shell, which is mounted on the hub axle of the hub body, having an open-ended connecting recess faced to the hub body, and a plurality of first engaging teeth formed on an inner periphery of the connecting recess; a coupling ring received inside the connecting recess, and a plurality of second engaging teeth, which are formed at an outer periphery of the coupling ring, provided to engage with the first engaging teeth of the connecting recess; an outer surface of the coupling ring, which is faced to the driving ring, having a plurality of second driving teeth arranged in a circular pattern, and an elastic spacer, which is secured in the connecting recess, coupled with an inner surface of the coupling ring; the elastic spacer formed in a ring shape, and an outer periphery of the elastic spacer connected to at least four elastic pieces; each of the elastic pieces connected to the elastic spacer through a supporting segment thereof, and an elastic segment, which is extended from the supporting segment, gradually titled to stick out of an outer surface of the elastic spacer, which is faced to the coupling ring, and ends of the elastic segments faced toward a same circumferential direction.

2. The bicycle hub apparatus of claim 1, wherein at least two tool holes respectively and axially penetrate through the driving ring.

* * * * *